United States Patent [19]

Okuchi et al.

[11] Patent Number: 5,730,519

[45] Date of Patent: Mar. 24, 1998

[54] HEADLIGHT FOR VEHICLE

[75] Inventors: Hiroaki Okuchi, Anjo; Hideyuki Kato, Nishio, both of Japan

[73] Assignee: Nippondenso Co., Ltd., Kariya, Japan

[21] Appl. No.: 551,313

[22] Filed: Nov. 1, 1995

[30] Foreign Application Priority Data

Nov. 11, 1994 [JP] Japan .................... 6-278027

[51] Int. Cl.$^6$ ........................................ F21V 5/00
[52] U.S. Cl. .................... 362/32; 362/61; 362/332; 385/33
[58] Field of Search ................... 385/32, 33, 901; 362/32, 61, 327, 332, 268, 331

[56] References Cited

U.S. PATENT DOCUMENTS

| 4,113,347 | 9/1978 | Gaertner | 385/33 |
| 4,610,513 | 9/1986 | Nishioka et al. | 385/33 |
| 4,811,172 | 3/1989 | Davenport et al. | 362/61 |
| 4,814,950 | 3/1989 | Nakata | 362/332 |
| 5,307,247 | 4/1994 | Cejnek | 362/61 |

FOREIGN PATENT DOCUMENTS

| 623780 | 11/1994 | European Pat. Off. |
| 678699 | 10/1995 | European Pat. Off. |
| 4320554 | 12/1993 | Germany |

*Primary Examiner*—Alan Cariaso
*Attorney, Agent, or Firm*—Cushman, Darby & Cushman IP Group of Pillsbury, Madison & Sutro LLP

[57] ABSTRACT

In order to prevent a driver from feeling strange when he looks at a boundary of illumination between a hot illumination zone and flat illumination zone, a light-grading optical member is provided. A headlight for a vehicle includes a fiberoptic cable and a lamp member for forming incident light beams into a desired illumination profile to illuminate portions in front of the vehicle. The lamp member is composed of a light conducting member to define the profile of the illumination by introducing the light beams from the fiberoptic cable, a first lens member for forming the hot illumination zone and a second lens member for forming the flat illumination zone. The optical member or means for refracting a portion of the light beams is formed on a periphery of the first lens member or on a periphery of the light conducting member, whereby a difference in brightness between the hot and flat illumination zones is reduced.

21 Claims, 8 Drawing Sheets

HEADLIGHT FOR VEHICLE

CROSS REFERENCE TO RELATED APPLICATION

The present application is based on and claims priority from Japanese Patent Application Hei 6-278027 filed on Nov. 11, 1994, the contents of which is incorporated herein by reference.

BACKGROUND OF THE INVENTION

1. Field of the Invention

The present invention relates to a lighting apparatus, and more particularly, to a headlight for a vehicle for illuminating a desired area by irradiating light beams having a designated profile of illumination.

2. Description of Related Art

Figure 7:
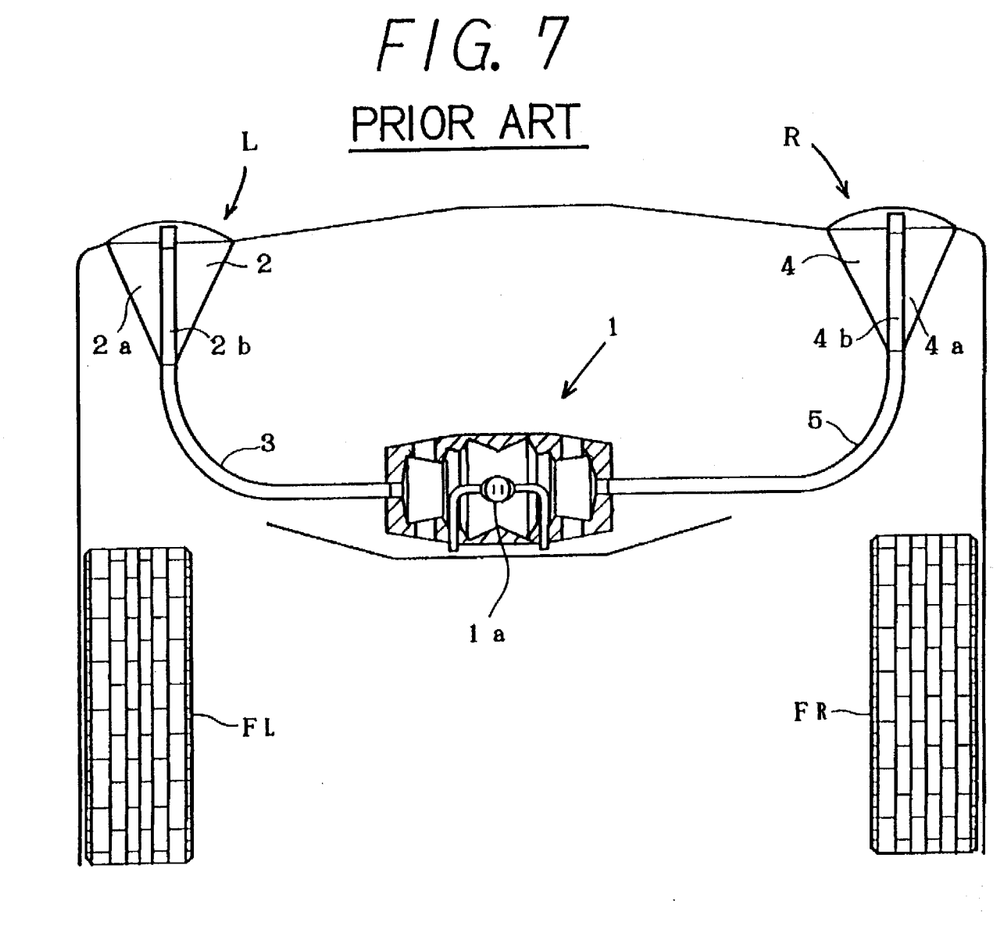
FIG. 7 is a schematic view illustrating a conventional headlight system for a vehicle.

Recently, a discharge-tube-type headlight system in combination with a control circuit has been developed. Since the control circuit is considerably expensive, a single centralized discharge-tube is disposed in a portion of the vehicle and light beams are introduced through fiber optic cables to portions where right and left head lights are located. For instance, Japanese Patent Unexamined Publication Hei 6-68702, which was filed by the assignee of this application, discloses an example as shown in FIG. 7 in this application. The headlight system includes a centralized light source 1 disposed in a front central portion of the vehicle and left and right head lights L and R. The centralized light source 1 has a generally cylindrical casing in which a discharge tube 1a as a linear light source 1 is positioned at an axially central portion. Reference characters FL and FR indicate left and right wheels.

The left head light L is composed of a lamp 2 disposed in a front left portion of the vehicle and a fiberoptic cable 3 which connects the centralized light source 1 and the lamp 2. The right head lamp R is composed of a lamp 4 disposed in a front right portion of the vehicle and a fiberoptic cable 5 which connects the centralized light source 1 and the lamp 4. The lamps 2 and 4 have first lens members 2a and 4a and second lens members 2b and 4b respectively. Each of the first lens members 2a and 4a is formed into generally a cone-shape which has an round light emitting lens surface with a designated radius and forms a hot illumination zone for the high beam position. Each of the second lens members 2b and 4b forms a left or right flat illumination zone for the low beam position.

Figure 8:
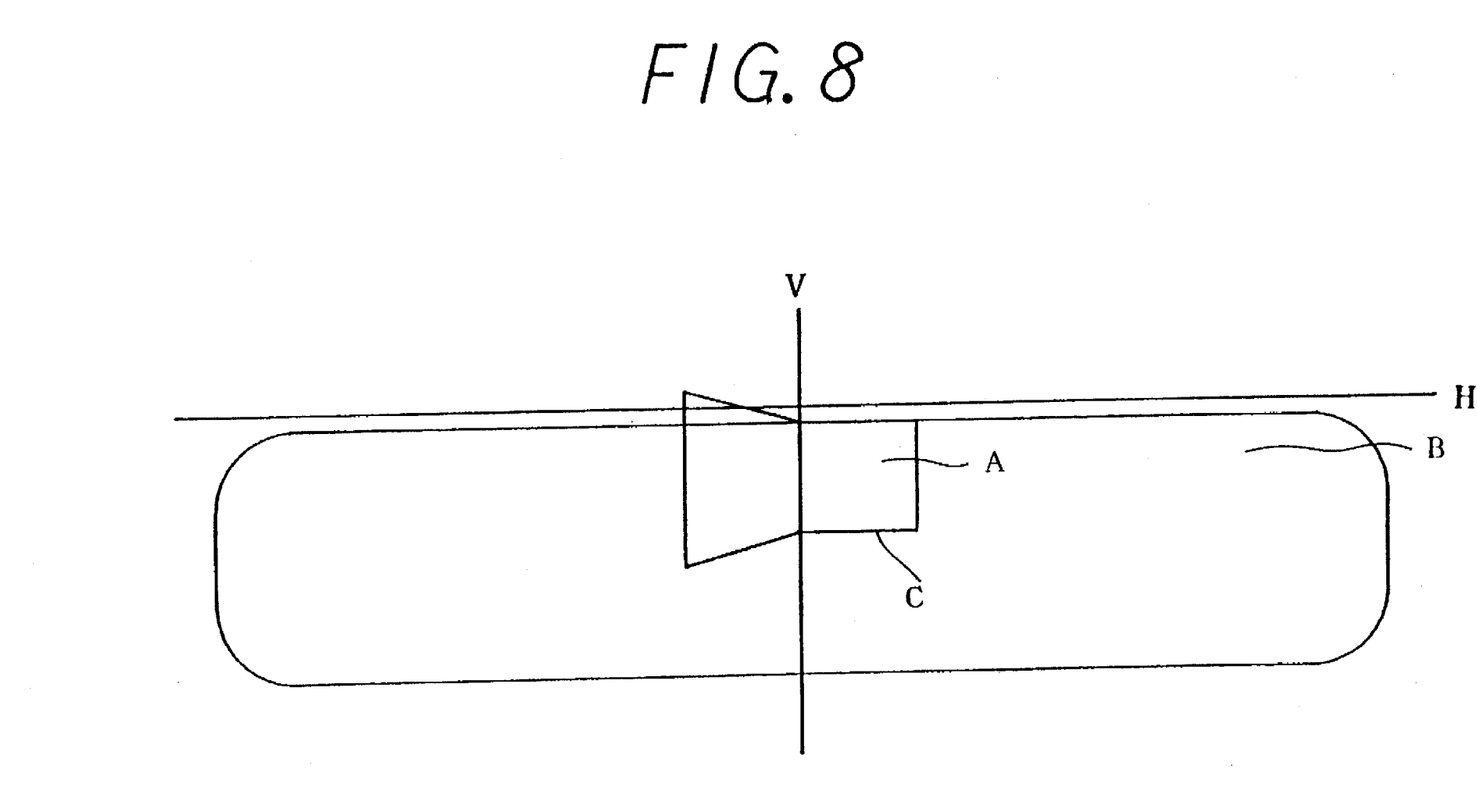
FIG. 8 is a view illustrating illumination provided by the headlight system shown in FIG. 8.
Figure 9:
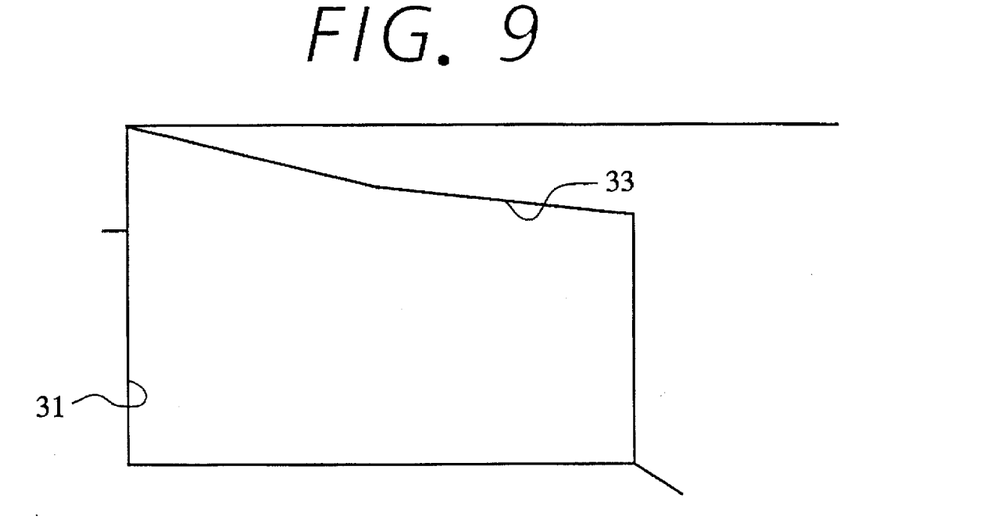
FIG. 9 is an exploded view showing the encircled portion of FIG. 2B when the upper surface section is formed to have two inclined surfaces.
Figure 10:
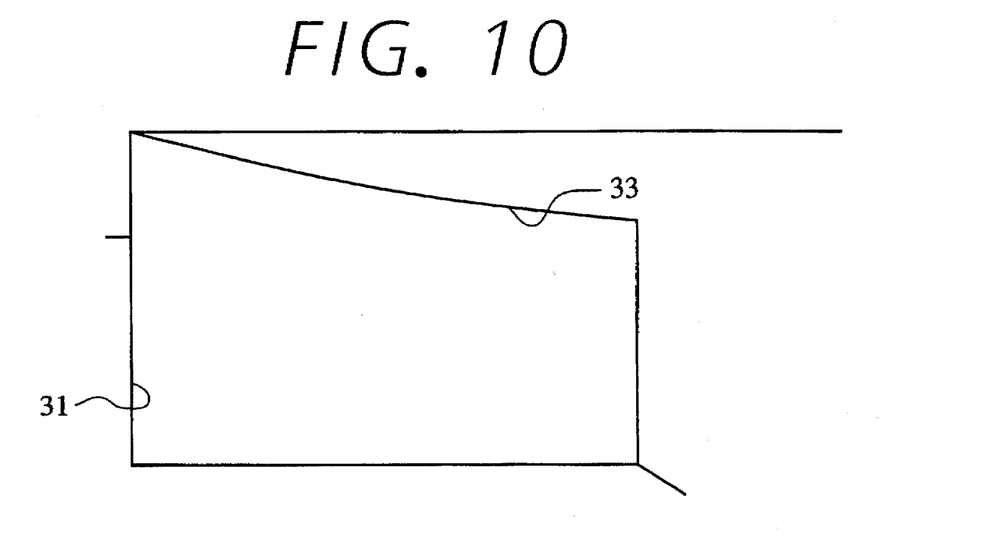
FIG. 10 is an exploded view showing the encircled portion of FIG. 2B when the upper surface section is formed to have a curved surface.

However with the above structure, since there is a big difference in the brightness of the illumination between the hot illumination zone A and the flat illumination zone B as shown in FIG. 8, a driver feels uncomfortable when he looks at the boundary C between the illumination zones A and B.

SUMMARY OF THE INVENTION

The present invention is made in view of the above problem, and has an object to provide a light gradation between the hot illumination zone and the flat illumination zone.

Another object of the present invention is to provide a headlight for a vehicle including a light source, a fiberoptic cable emitting light beam from the light source and a lamp member introducing the light beam from the fiberoptic cable to illuminate portions in front of the vehicle. In this headlight the lamp member is formed of a first lens member for forming the light beam from the fiberoptic cable into a desired profile of a hot illumination zone, a second lens member for illuminating a wider and darker zone than the hot illumination zone and an optical member for reducing difference in brightness between the two zones.

Another object of the present invention is to provide a headlight for a vehicle, wherein the first lens member has an approximately spherical light emitting surface having a focal point near a light incident surface thereof and total reflection surfaces spreading from the light incident surface toward the light emitting surface, the second lens member has closely facing substantially vertical surfaces at both sides thereof and a vertically arc-shaped and horizontally straight surface with a focal point near a light incident surface thereof, and the optical member is formed around the total refection surface as an inclined reflecting surface.

A further object of the present invention is to provide a headlight for a vehicle including a light conducting member to define a profile of the illumination zones. The light conducting member has a light emitting surface a half of which is suitable for hot zone illumination and the other half of which is suitable for wide zone illumination. The light emitting surface for hot zone illumination is connected to the light incident surface of the second lens member, and the optical member is disposed to spread the light emitting surface steeply toward the first lens member.

As a result, the difference in brightness between the hot illumination zone and the wide illumination zone becomes small and a driver will not feel strange even if they overlap each other. Further, only the inclined reflecting surfaces are disposed on the total reflection surface of the lens member for the hot zone illumination, or the light emitting portion of the light conducting member has a shape spreading steeply toward the lens for the hot zone illumination. Therefore, the headlight providing light gradation can be made simple and manufactured with ease at a low production cost.

BRIEF DESCRIPTION OF THE DRAWINGS

Other objects, features, and characteristics of the present invention as well as the functions of related parts of the present invention will become clear from a study of the following detailed description, the appended claims and the drawings. In the drawings:

FIG. 2 A is plan view of the headlight illustrated in FIG. 1.

DETAILED DESCRIPTION OF THE PREFERRED EMBODIMENT

A headlight for a vehicle according to the present invention is described with reference to the appended drawings.

Figure 1:
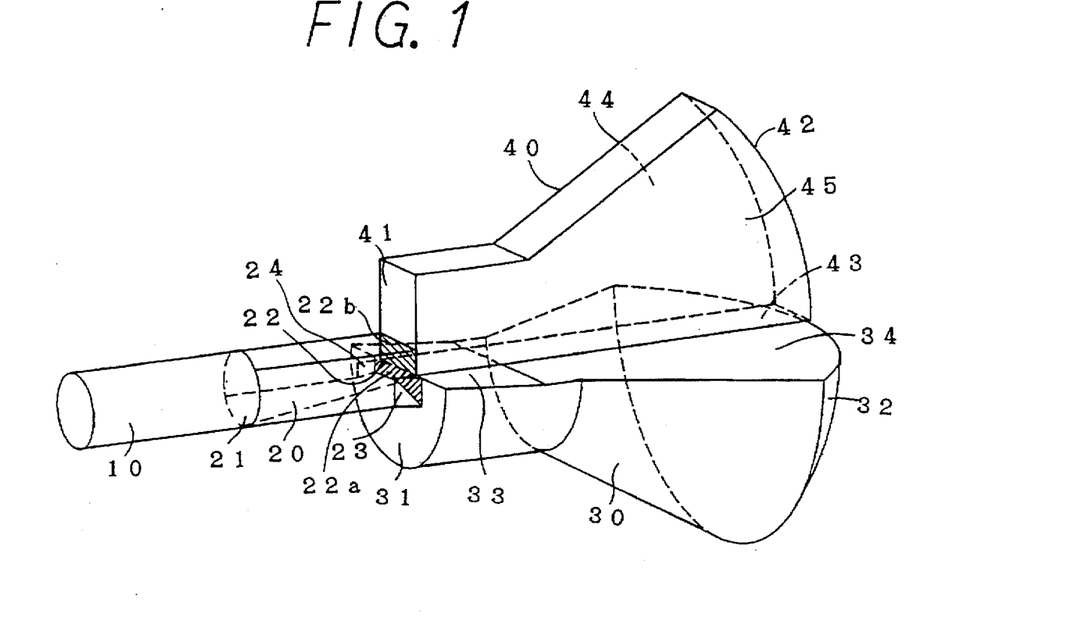
FIG. 1 is a perspective view illustrating a main part of a headlight according to a first embodiment of the present invention.
Figure 2A:
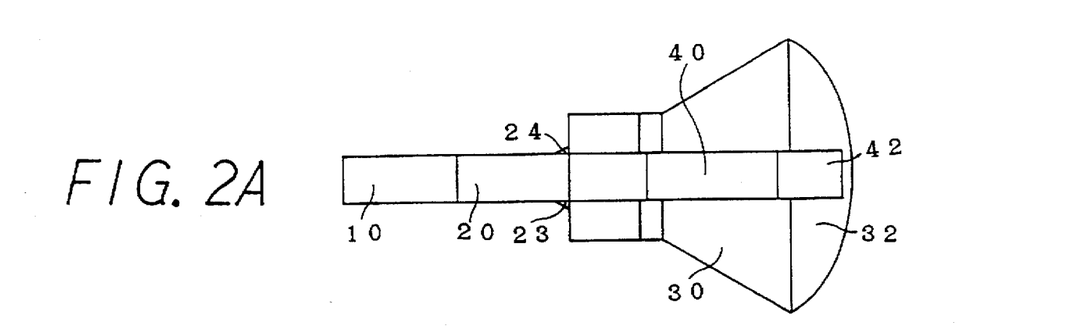
Figure 2B:
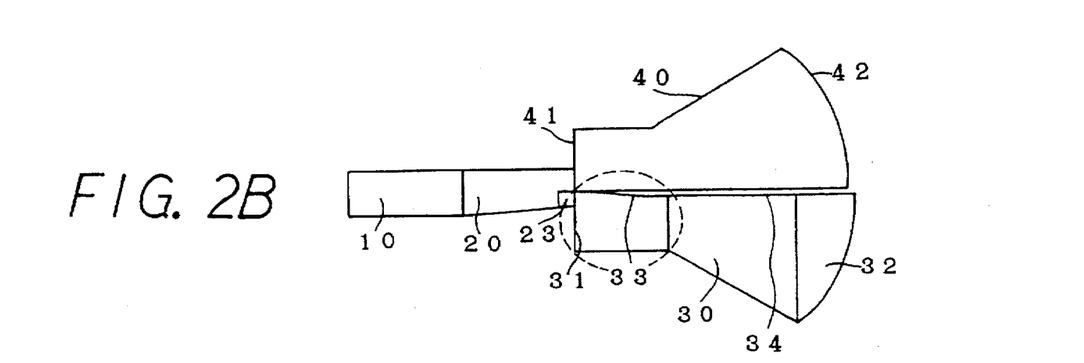
FIG. 2B is a side view thereof.

FIG. 1 is a perspective view illustrating a main part of a headlight according to a first embodiment of the present invention, FIG. 2A is a plan view of the head light illustrated in FIG. 1 and FIG. 2B is its side view. In FIG. 1, FIG. 2A and FIG. 2B, a light beam emitted from a centralized light source (not shown, cf. reference numeral 1 in FIG. 7) is introduced by a fiberoptic cable 10 into a light-conducting member 20. The light conducting member 20 forms the light beams into illumination profile. Then, the light beams are introduced into a first lens member 30 for a hot zone illumination and a second lens member 40 for wide flat illumination respectively. A lamp of the headlight is formed of the first lens for hot zone illumination and the second lens for wide flat illumination.

The fiberoptic cable 10 is formed of a rod core and cladding. The cladding is made of material which has a smaller refractive index than the rod core in order to provide total internal reflection of light.

The first lens member 30 and the second lens member 40 are made of material having good light transmission characteristics such as polycarbonate or acrylic resin. In order to provide two types of illumination, that is the hot zone illumination and the wide flat illumination, the lens unit of the headlight according to the first embodiment is formed of two separate lens members. The first lens member 30 is shaped into a cone expanding from a light incident surface 31 toward an approximately spherical (slightly aspheric to correct for spherical aberration) light emitting surface 32 which has its internal focal point located near the incident surface 31.

An upper surface of the first lens member 30 is formed of an upper surface section 33 descending from a plane near the axis of the cone and an upper surface section 34 in parallel with the plane near the axis of the cone, and the first lens member 30 is a lower half body of a trumpet-shape which is divided by the upper surface sections 33 and 34.

The second lens member 40 has vertical plane surfaces 44 and 45 on both sides thereof and a light emitting front surface 42 which is formed arc-shaped (which is slightly corrected for aberration) with the internal focal point located near an incident surface 41 and horizontally rectangular bottom surface 43 which is located near the axis and in parallel therewith.

The upper surface of the first lens member 30 is composed of the upper surface sections 33 and 34, and the bottom surface 43 of the second lens member 40 is positioned to face the upper surface sections 33 and 34. The upper surface sections 33 and 34 of the first lens member 30 function as total reflection surfaces of the light beams coming into the incident surface 31. Therefore, the light beams are irradiated from the first lens member 30 as if they are guided by a cylindrical light conducting member which is composed of not only a lower half of the light conducting member but also a symmetric upper half which is mirrored from the lower half thereof. The bottom surface 43 of the second lens member 40 becomes a total reflection surface of the light beams coming into the incident surface 41, they are irradiated through the second lens member 40 as if they are guided by a cylindrical light conducting member which is composed of not only an upper half of the light conducting member 20 but also a symmetric lower half mirrored from the upper half thereof.

Since the first lens member 30 is a common omnidirectional lens, the light beams are magnified and focused to an inverted original image, forming a hot zone illumination which illuminates comparatively narrow area brightly. The second lens member 40 is a mere vertical lens and magnifies the light beams only in the vertical direction, so that the light beams become natural scattering light in the horizontal direction. That is, the light beams are collimated only in the vertical direction and scattered horizontally to provide relatively dark flat illumination as compared with the hot zone illumination.

Figure 4:
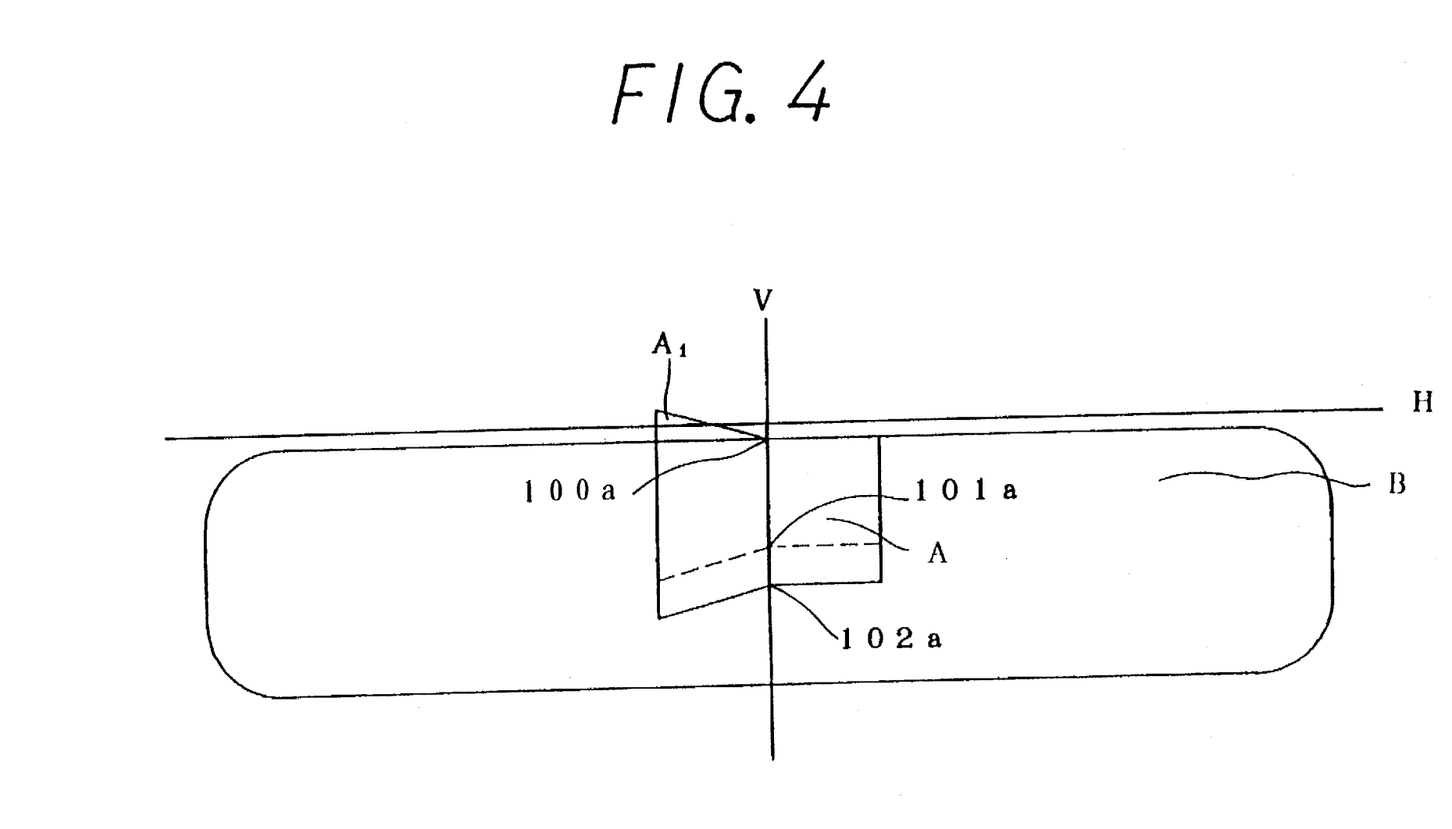
FIG. 4 is a view illustrating illumination by the headlight according to the first embodiment of the present invention.

As a result, front illumination area is formed in the vertical and horizontal directions V and H as shown in FIG. 4. The illumination area is composed of a centralized illumination area, which is the hot illumination zone A, and a decentralized illumination area, which is the flat illumination zone B. This illumination pattern is provided when the low beam or passing (or meeting) beam of the head light is selected in order not to cause glare in cars running in the opposite direction. A left upper portion $A_1$ of the hot illumination zone A shown in FIG. 4 is enlarged to illuminate pedestrians. The opposite enlarged lower portion is incidentally formed symmetric due to the mirror reflection.

Figure 3:
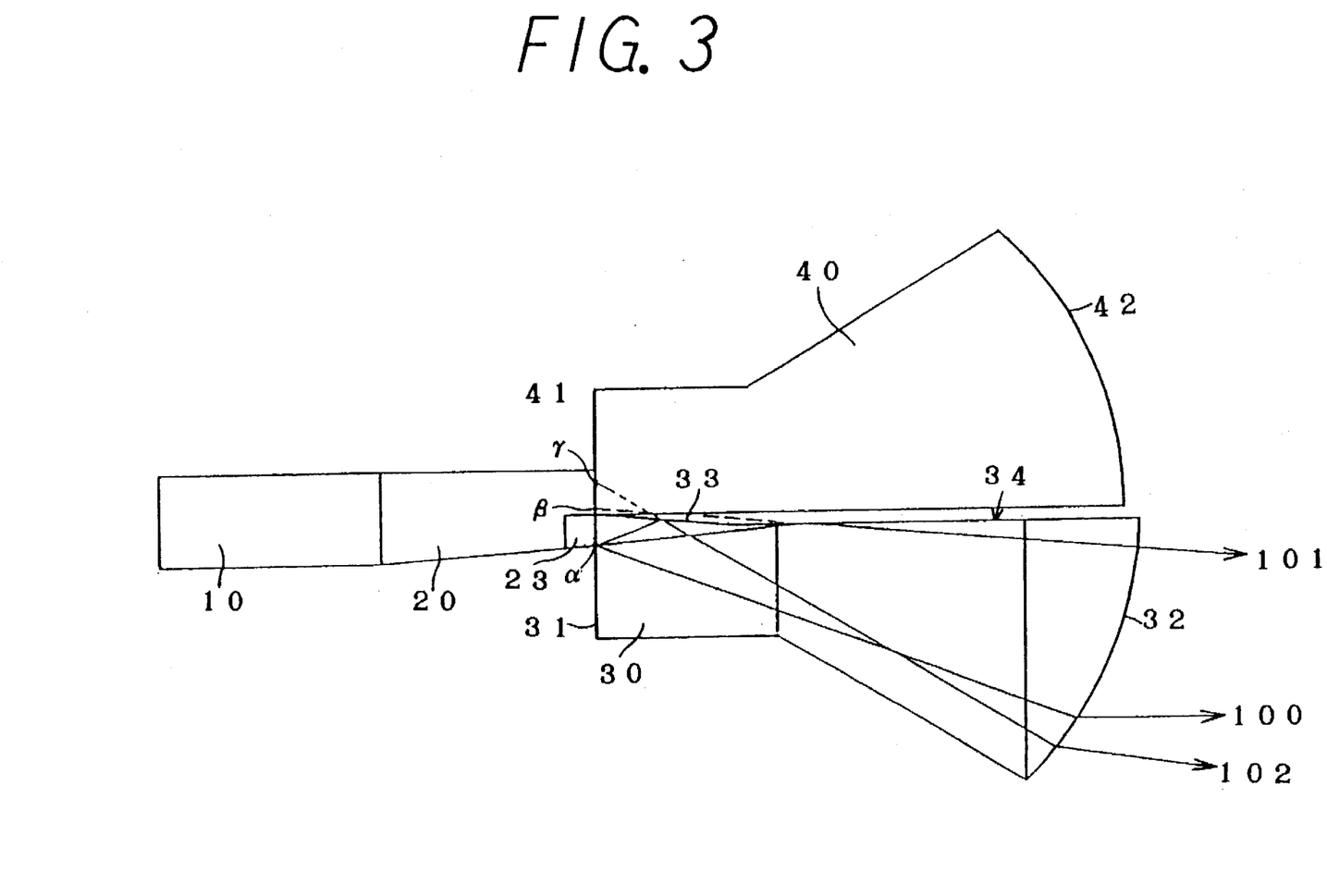
FIG. 3 is a view illustrating optical paths of light beams of the headlight according to the first embodiment of the present invention.

A light beam 100 is emitted from a portion α of a light emitting surface 22a located at a central lower portion of the lower half of the light conducting member 20 as illustrated in FIG. 3. It goes out directly from the light emitting surface 32 without being reflected by the upper surface sections (total reflecting surfaces) 33 and 34 and reaches a portion 100a shown in FIG. 4. Since the total reflection surface (upper surface section 34) is formed in parallel with a plane near the central axis of the cone, a light beam 101 is reflected by the upper surface section 34 of the first lens member 30 and reaches a portion 101a shown in FIG. 4 equally as the light beam emitted from a portion β of the lower half light emitting surface of the light conducting member 20. On the other hand, since the total reflection surface is formed on the upper surface section 33 descending from the plane near the axis of the cone, a light beam 102 reflected by the surface section 33 reaches a portion 102a equally as a light beam emitted from a portion γ of the upper half light emitting surface 22b of the light conducting member 20.

Since the total reflection surface is formed on a surface section 33 descending from the plane near the axis of the cone, a lower portion of the hot illumination zone A is spread as indicated by a broken line in FIG. 4 and the brightness of the spread area decreases as weak as the flat zone illumination B.

The light conducting member 20 has a light incident surface 21 which includes the entire surface (a circular surface is shown in the figures) of the fiberoptic cable 10 (that is, the incident surface is a little larger) and the light emitting surface 22 which is made of good light conductive material having a suitable light refractive index such as acrylic resin to define suitable illuminating zone or profile. The portion between the incident surface 21 and the light emitting surface 22 is formed by smoothed peripheries connecting both surfaces 21 and 22. All the light beams emitted from the fiberoptic cable 10 enter the light conducting member 20 and are introduced directly or reflected zigzag therethrough to form light beams having a profile of the light emitting surface 22.

If the light conducting member 20 is too short, the central portion of the light emitting surface 22 becomes brighter than other portions. It is found that sufficiently bright and entire illumination of the light emitting surface 22 is practically possible if the length thereof is between 30 mm and 50 mm when the diameter of the light incident surface 21 is about 10 mm. In FIG. 1, the lower portion 22a of the light emitting surface 22 is disposed in contact with the light incident surface 31 of the first lens member 30 to introduce the light beams for the hot zone illumination to the first lens member 30. The upper portion 22b of the light emitting surface 22 is disposed in contact with the light incident surface 41 of the second lens member 40 to introduce the light beams for the flat zone illumination.

Figure 5:
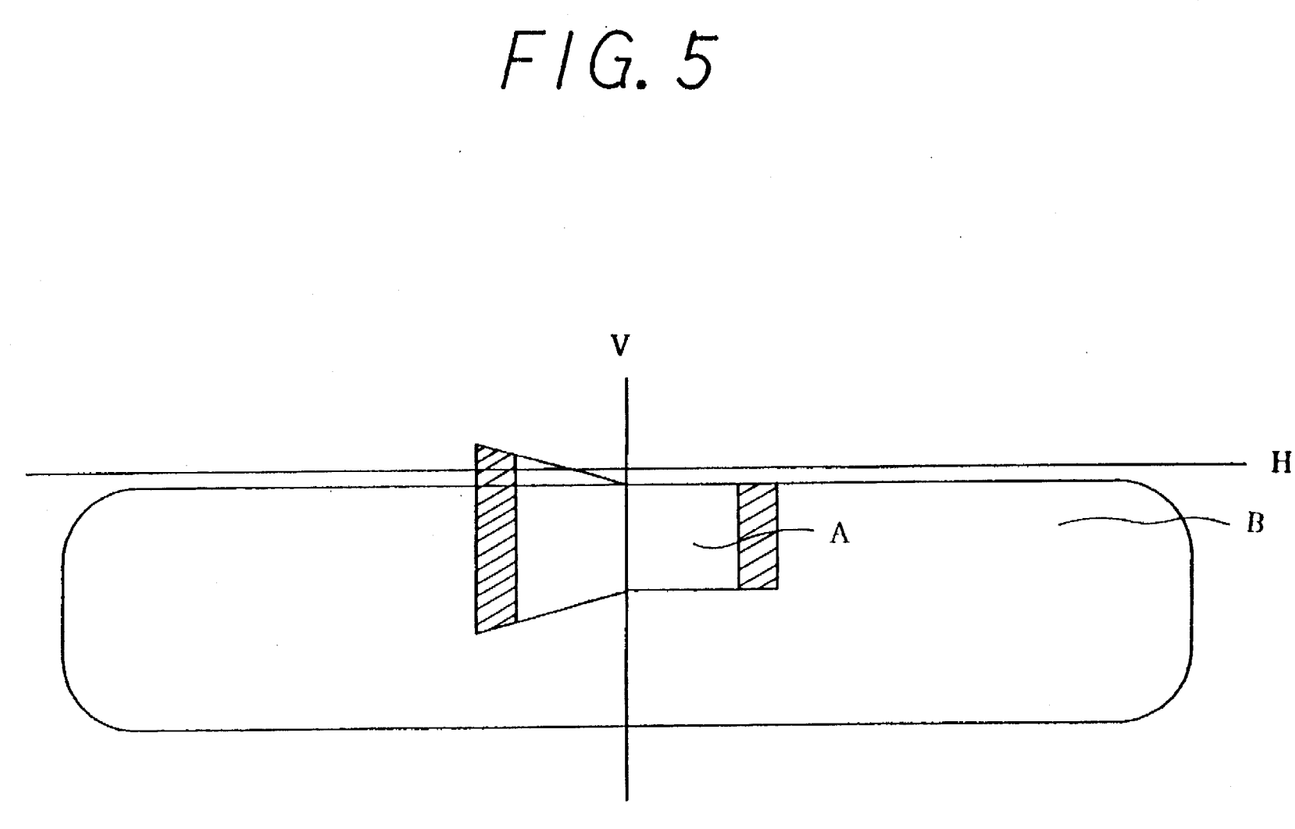
FIG. 5 is a view illustrating illumination by the headlight according to the first embodiment of the present invention.

The light emitting portions 23 and 24 (shown in FIG. 2A) of the light conducting member 20 for introducing the light beam for the hot zone illumination to the first lens 30 have steep surfaces spreading toward the lens member 30 so that the hot zone illumination A is spread horizontally as indicated by hatching shown in FIG. 5. As a result, the brightness of the spread portions (hatched portions) decreases to have little difference in brightness from the flat zone illumination.

As described in this embodiment, since the gradation is formed at the boundary of the hot zone illumination A and the flat zone illumination B (the broken line in FIG. 4 and the hatched portions in FIG. 5), a driver does not feel strange when he looks at the overlapping two illumination zones. Since only a descending surface section 33 and steeply spreading surfaces 23 and 24 are formed partially on the total reflection surface of the first lens member 30 for the hot zone illumination in order to have the light-gradation, headlights can be made simple, and produced with ease at a reduced cost.

Figure 6:
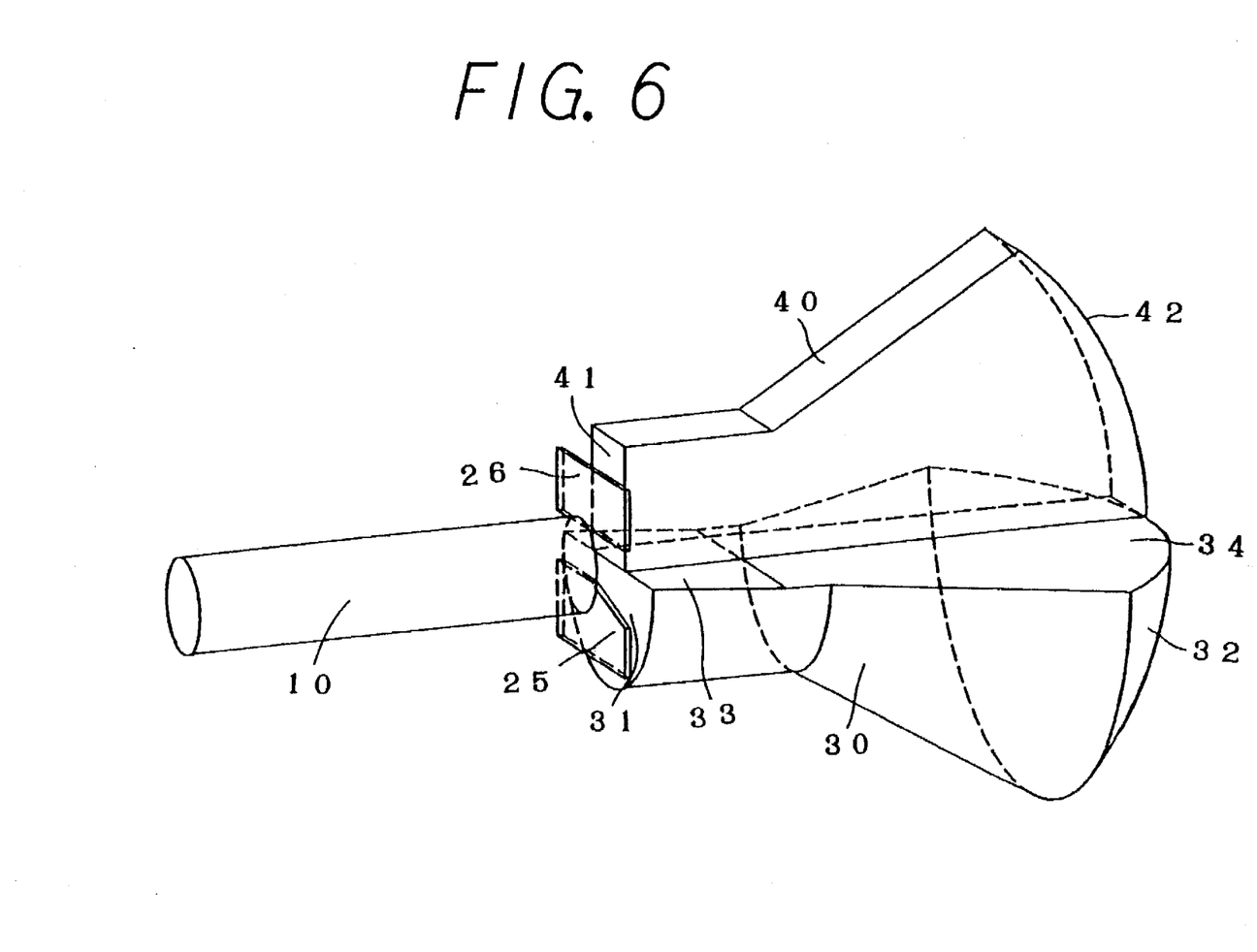
FIG. 6 is a perspective view illustrating a main part of a headlight according to a second embodiment of the present invention.

The light conducting member 20 is provided to define the profile of illumination in the above embodiment. However, according to a second embodiment of the present invention, it can be replaced with shade plates 25 and 26 as shown in FIG. 6. In this case, the hot zone illumination is spread only to the lower portion in FIG. 4.

A plurality of descending surfaces or a continuously curved surface can be formed on the total reflecting surface of the first lens member 30 instead of the single descending surface section 33 of the above embodiment.

The first lens member and the second lens member 40 can be replaced with a unit of continuously formed first and second lens member.

Since the upper inclined cut line of the hot zone illumination must be clear, any optical member to provide light gradation at the boundary of the hot zone such as reflecting surface or incident surface is not formed thereon.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A headlight for a vehicle including a light source, a fiberoptic cable for emitting light beams from said light source, and a lamp member for introducing said light beams from said fiberoptic cable to illuminate portions in front of said vehicle, wherein said lamp member comprises:
   a cone-shaped lens member configured to form said light beams from said fiberoptic cable into a prescribed profile of a hot illumination zone; and
   an arc-shaped lens member configured to form said light beams from said fiberoptic cable into a flat illumination zone;
   wherein said hot illumination zone is a centralized illumination zone area overlapping said flat illumination zone,
   said hot illumination zone is narrow and bright compared to said flat illumination zone, and
   said cone-shaped lens member has a surface for providing light-gradation at a portion around said hot illumination zone.

2. A headlight for a vehicle claimed in claim 1, wherein
   said cone-shaped lens member comprises an approximately spherical light emitting surface having a focal point near a light incident surface thereof and a reflection surface spreading from said light incident surface toward said light emitting surface;
   said arc-shaped lens member comprises closely facing substantially vertical surfaces at both sides thereof, and a vertically arc-shaped surface with a focal point near a light incident surface of said arc-shaped lens member, and
   said reflection surface of said first lens member comprises an inclined surface descending from an upper portion of said light incident surface of said cone-shaped lens member toward said light emitting surface of said cone-shaped lens member.

3. A headlight for a vehicle claimed in claim 2, wherein said inclined surface of said cone-shaped lens member comprises a plurality of inclined surfaces.

4. A headlight for a vehicle claimed in claim 2, wherein said inclined surface of said cone-shaped lens member comprises a continuously curved surface.

5. A headlight for a vehicle claimed in claim 1, further comprising a light conducting member having a light incident surface receiving light beams from said fiberoptic cable, a first light emitting surface defining said hot zone illumination and a second light emitting surface defining said flat illumination, zone said and second light emitting surfaces being disposed in contact with said light incident surfaces of said cone-shaped lens member and said arc-shaped lens member respectively.

6. A lighting apparatus, comprising:
   a first lens member having a light incident surface for receiving light beams from a light source and a light emitting surface for supplying light beams to a first illumination zone;
   a second lens member for supplying light beams from said light source to a second illumination zone which overlaps said first illumination zone and is wider than said first illumination zone;
   a profile forming member disposed on a portion of said first lens member for forming a profile of said first illumination zone, and
   a light-gradation member formed integrally with said first lens member for providing light-gradation at a portion around said first illumination zone.

7. A lighting apparatus claimed in claim 6, wherein said profile forming member is disposed near said light incident surface of said first lens member.

8. A lighting apparatus claimed in claim 7, wherein said light-gradation member is formed at a side portion of said light incident surface of said first lens member.

9. A lighting apparatus claimed in claim 8, wherein said first lens member comprises a projecting member having a steep surface spreading toward said light incident surface of said first lens member.

10. A lighting apparatus claimed in claim 6, wherein said light-gradation member comprises a plurality of reflection surfaces on a periphery of said first lens member for introducing light beams from said light incident surface to said light emitting surface respectively at different reflecting angles.

11. A lighting apparatus claimed in claim 6, wherein said light-gradation member comprises a plurality of light reflecting surfaces.

12. A headlight for a vehicle claimed in claim 11, wherein said light reflecting surface is disposed at an upper portion of said light incident surface to reflect light beams forming a bottom portion of said first illumination zone.

13. A headlight for a vehicle claimed in claim 6 further comprising:
   a light source for supplying light beams;
   a fiberoptic cable for introducing said light beams from said light source to said light incident surfaces of said first and second lens members.

14. A headlight for a vehicle, comprising:
   a first lens member having a light incident surface and a light emitting surface and being configured to supply light beams from a light source to a first illumination zone;
   a second lens member having a light incident surface and a light emitting surface and being configured to supply light beams from said light source to a second illumination zone which overlaps said first illumination zone and is wider than said first illumination zone;
   a profile forming member disposed adjacent a portion of said first lens member and being configured to form a profile of said first illumination zone, and
   a light-gradation member configured to provide gradation at a portion around said first illumination zone.

15. A headlight for a vehicle claimed in claim 14, wherein said profile forming member is disposed on said light incident surface of said first lens member.

16. A headlight for a vehicle claimed in claim 15, wherein said light-gradation member is disposed at a side portion of said light incident surface of said first lens member to provide said gradation at a side portion of said first illumination zone.

17. A headlight for a vehicle claimed in claim 16, wherein said first lens member comprises a projecting member spreading toward said light incident surface of said first lens member.

18. A headlight for a vehicle claimed in claim 14, wherein said light-gradation member comprises a plurality of reflection surfaces on a periphery of said first lens member for introducing light beams from said light incident surface to said light emitting surface respectively at different reflecting angles.

19. A headlight for a vehicle claimed in claim 14 further comprising:
   a light source for supplying light beams;
   a fiberoptic cable for introducing said light beams from said light source to said light incident surfaces of said first and second lens members.

20. A headlight for a vehicle claimed in claim 14, wherein said light-gradation member comprises a shade member for providing gradation at a portion overlapping with said second illumination zone.

21. A headlight, comprising:
   a cone-shaped lens adapted and constructed to receive light and to cause the light to obtain a first illumination profile to thereby form a hot illumination zone, said cone-shaped lens having a surface adapted and constructed to cause light-gradation at, at least, a portion of an edge of the hot illumination zone; and
   an arc-shaped lens adapted and constructed to receive light and to cause the light to obtain a second illumination profile, larger than said first illumination profile, to thereby form a flat illumination zone;
   wherein said hot illumination zone is a centralized illumination zone area overlapping said flat illumination zone,
   said hot illumination zone is narrow and bright compared to said flat illumination zone.

* * * * *